United States Patent [19]

Misra

[11] Patent Number: 4,656,156

[45] Date of Patent: Apr. 7, 1987

[54] ADSORBENT AND SUBSTRATE PRODUCTS AND METHOD OF PRODUCING SAME

[75] Inventor: Chanakya Misra, Plum Borough, Pa.

[73] Assignee: Aluminum Company of America, Pittsburgh, Pa.

[21] Appl. No.: 820,166

[22] Filed: Jan. 21, 1986

[51] Int. Cl.$^4$ .................... B01J 21/04; B01J 21/10
[52] U.S. Cl. .................... 502/415; 502/414; 502/439
[58] Field of Search ............... 502/174, 414, 415, 439

[56] References Cited

U.S. PATENT DOCUMENTS

| | | | |
|---|---|---|---|
| 201,028 | 3/1878 | Lowig | 423/121 |
| 3,320,029 | 5/1967 | Adams | 23/201 |
| 3,539,306 | 11/1970 | Kumura et al. | 23/315 |
| 3,650,704 | 3/1972 | Kumura et al. | 23/315 |
| 3,701,718 | 10/1972 | Papee et al. | 502/415 X |
| 4,046,855 | 9/1977 | Schepers et al. | 423/130 |
| 4,145,400 | 3/1979 | Adsetts | 423/419 |
| 4,229,309 | 10/1980 | Cheng et al. | 252/25 |
| 4,443,433 | 4/1984 | Knecht et al. | 424/157 |
| 4,482,542 | 11/1984 | Schneider et al. | 424/157 |

FOREIGN PATENT DOCUMENTS 404028 1/1934 United Kingdom.

OTHER PUBLICATIONS

"Physico-Chemical Properties of Synthetic Hydrotalcites in Relation to Composition" *Clays and Clay Minerals*, vol. 28, No. 1, 50–56, 1980.
"The Syntheses of Hydrotalcite-Like Compounds and Their Structures and Physico-Chemical Properties . . . ", *Clays and Clay Minerals*, vol. 23, pp. 369–375, 1975.
"Neoformation of Hydrotalcite Due to Industrial Inputs in Marine Sediments", *American Mineralogist*, vol. 62, pp. 1173–1179, 1977, Stoffyn et al.
"Synthesis of Hydrotalcite-Like Compounds and Their Physico-Chemical Properties . . . ", *Clays and Clay Minerals*, vol. 25, pp. 14–18, 1977.
"Synthesis of New Hydrotalcite-Like Compounds and Their Physico-Chemical Properties", *Chemistry Letters*, pp. 843–848, 1973.
"Properties of a Synthetic Magnesium-Aluminum Carbonate Hydroxide and its Relationship to Magnesium-Aluminum Double Hydroxide, Manasseite and Hydrotalcite", *The American Mineralogist*, vol. 52, Jul.-Aug., 1967.
"The System $MgO-Al_2O_3-H_2O$ and Influence of Carbonate and Nitrate Ions on the Phase Equilibria", *American Journal of Science*, vol. 251, May 1953, pp. 337–361.
*Handbook of Chemical Synonyms and Trade Names*, 1978, p. 365.

*Primary Examiner*—W. J. Shine
*Attorney, Agent, or Firm*—Douglas G. Glantz

[57] ABSTRACT

Novel adsorbent and substrate compositions are formed by mixing activated aluminas and synthetic hydrotalcite produced by reacting activated magnesia with an aqueous solution containing aluminate, carbonate, and hydroxyl ions. Activated magnesia used in this method is formed by heating a magnesium compound such as magnesium carbonate or magnesium hydroxide to a temperature between about 500°–900° C. The method is suited to producing synthetic hydrotalcite from industrial Bayer liquor. The synthetic hydrotalcite so formed can be heated to a temperature of about 500°–600° C. to form a highly porous and adsorbent product either before or after mixing with activated aluminas to form the composite of the present invention.

15 Claims, 3 Drawing Figures

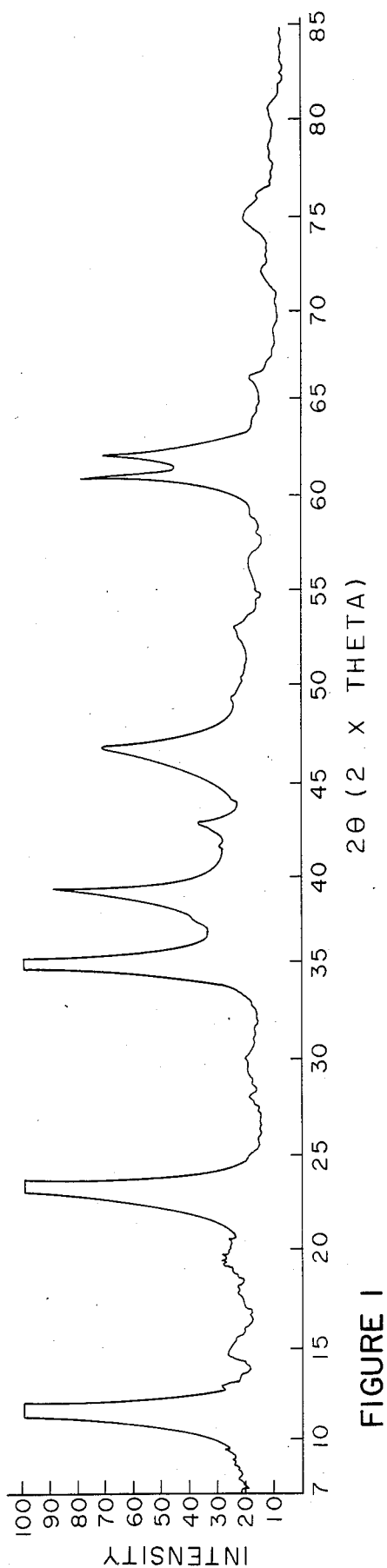
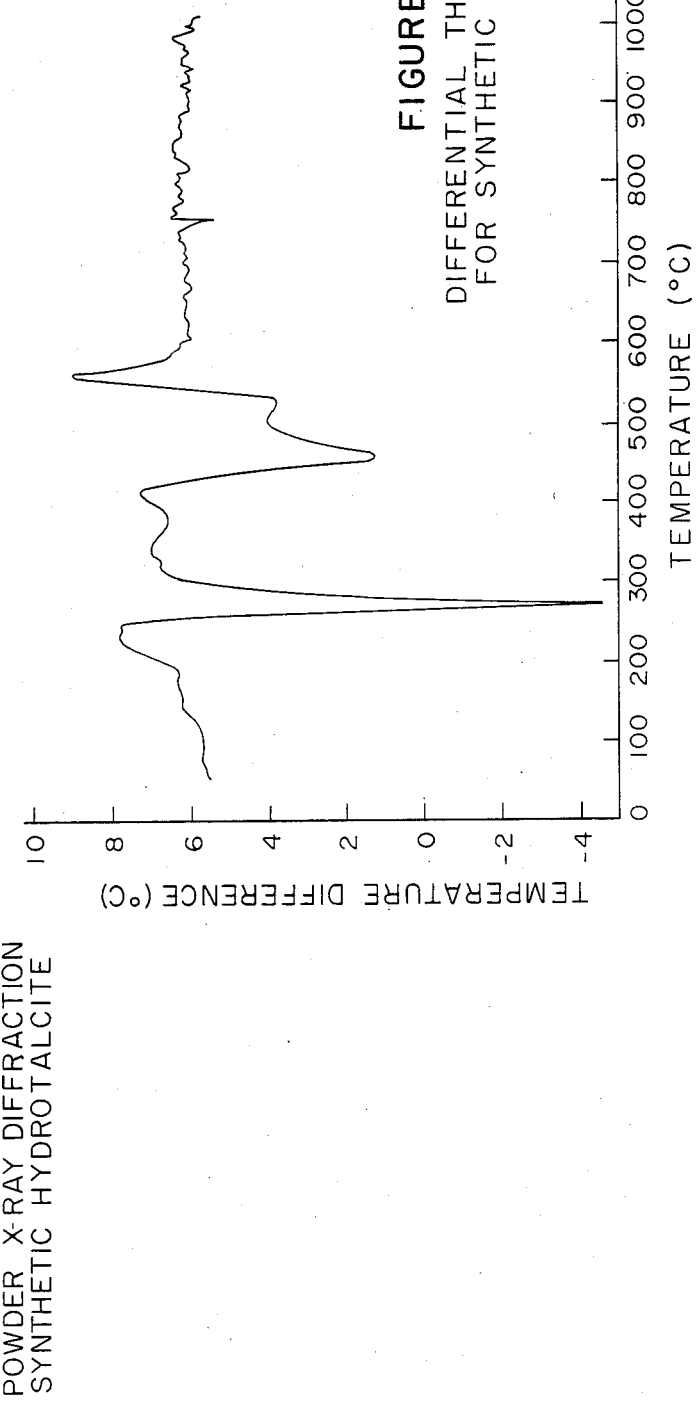
FIGURE 1
POWDER X-RAY DIFFRACTION
SYNTHETIC HYDROTALCITE
FIGURE 2
DIFFERENTIAL THERMAL ANALYSIS
FOR SYNTHETIC HYDROTALCITE

SYNTHETIC HYDROTALCITE
(5000 X)

ADSORBENT AND SUBSTRATE PRODUCTS AND METHOD OF PRODUCING SAME

BACKGROUND OF THE INVENTION

This invention relates to novel adsorbents and substrates and methods for producing same from synthetic hydrotalcite and activated aluminas.

Activated aluminas, made by various procedures, have been widely used as adsorbents and also as substrates for catalytically active materials. Procedures have been developed to manufacture alumina in various forms and properties for use as adsorbents, desiccants, and catalyst substrates.

A common and most widely used activated alumina product is produced by the thermal dehydration or activation of aluminum hydroxides. Such hydroxides include both crystalline and gelatinous aluminum hydroxides. Upon dehydration, water is expelled, leaving behind a porous skeleton of aluminum oxide of high surface area, e.g., such as 50–450 $m^2/g$. The pore structure of the alumina and the high surface area are important properties of the alumina influencing its behavior as an adsorbent. The size and geometry of the pores formed during dehydration is related primarily to the molecular structure of the hydroxide and can be altered only by a relatively small extent by varying the methods of hydroxide preparation, forming, dehydration, and other procedures.

However, the major fraction of the pores of dehydrated aluminum hydroxide are of small size, as determined by mercury penetration methods, e.g., such as less than than about 50 Å in diameter. This small size of pores is a major disadvantage of activated alumina for the adsorption of large molecules and also for catalytic uses where the pores can get blocked easily by impurities, by large molecules, by coke, or by other by-products of the reaction.

Activated carbon has been used widely as a multipurpose adsorbent. However, the adsorptive ability of activated carbon is insufficient for adsorption of organic acids such as carboxylic acids and sulfonic acids, decolorization of waste liquors containing acid dyes, and adsorption of alkalies.

La Lande, U.S. Pat. No. 2,413,184, discloses the preparation of adsorbent compositions, more particularly the production of water-insoluble metal aluminates suitable for use as decolorizing adsorbents and catalysts. An alkali metal aluminate is dispersed in sufficient water to dissolve the compound, and then is added to a second solution containing an ammonium salt and a salt of a metal capable of forming a water-insoluble metal aluminate. The mixture then is heated, preferably to its boiling point, for a period of time sufficient to complete the reaction.

Zall, U.S. Pat. No. 3,876,451, discloses activated carbon for the removal of phosphate from waste effluents. The activation of the carbon is accomplished by introducing cations, such as aluminum, manganese, zinc, iron, lithium, or calcium, into the carbon structure. The cations have the ability to react with the phosphates and the waste effluents and thereby fix the phosphates in the carbon material.

Manabe et al, U.S. Pat. No. 4,458,030, disclose an adsorbent composition consisting essentially of 5–95% by weight of hydrotalcite and about 95–5% by weight of activated carbon. The patent discloses that hydrotalcite compounds of magnesium oxide do not show an effective adsorptive power for the adsorption of phenols and amines. Manabe discloses that it has been virtually impossible to remove various substances by adsorption with one type of adsorbent. Rather, complicated and disadvantageous adsorption process steps involving several adsorbing and removing operations have been necessary using different types of adsorbent.

Reichle, U.S. Pat. No. 4,458,026, discloses novel catalyst materials produced as a preparation of Mg/Al/carbonate hydrotalcite which involves the addition of mixed magnesium/aluminum nitrates, sulphates, or chlorides as an aqueous solution to a solution of a stoichiometric amount of sodium hydroxide and carbonate at about 25°–35° C. while stirring over a several-hour period to produce a slurry. The slurry then is heated for about 18 hours at about 50°–200° C. (preferably 60°–75° C.) to allow a limited amount of crystallization to take place. After filtering the solids, and washing and drying, the dry solids are recovered.

Hydrotalcite is a naturally occurring mineral having the formula 6 $MgO.Al_2O_3.CO_2.12\ H_2O$ or $Mg_6Al_2(OH)_{16}CO_3.4\ H_2O$. Known deposits of natural hydrotalcite are very limited. Natural hydrotalcite has been found in Snarum, Norway and in the Ural Mountains. Typical occurrences are in the form of serpentines, in talc schists, and as an alteration product of spinel where, in some cases, hydrotalcite has formed as pseudomorphs after spinel.

The upper stability temperature of hydrotalcite is lower than the lower limit for spinel. Spinel and hydrotalcite theoretically never would appear together in stable condition. If equilibrium has been established, the spinel would be completely changed to hydrotalcite. However, naturally occurring hydrotalcite is intermeshed with spinel and other materials.

Natural hydrotalcite is not present as pure product and always contains other minerals such as penninite and muscovite and potentially undesirable minerals such as heavy metals. Conventional practice recognizes that it is practically impossible to remove such impurities from a natural hydrotalcite.

Previous attempts to synthesize hydrotalcite have included adding dry ice or ammonium carbonate (a) to a mixture of magnesium oxide and alpha-alumina or (b) to a thermal decomposition product from a mixture of magnesium nitrate and aluminum nitrate and thereafter maintaining the system at temperatures below 325° C. at elevated pressures of 2,000–20,000 psi. Such a process is not practical for industrial scale production of synthetic hydrotalcite by reason of the high pressures. Furthermore, the high pressure process forms substances other than hydrotalcite, such as brucite, boehmite, diaspore, and hydromagnesite.

Ross and Kodama have reported a synthetic mineral prepared by titrating a mixed solution of $MgCl_2$ and $AlCl_3$ with NaOH in a $CO_2$ free system and then dialyzing the suspension for 30 days at 60° C. to form a hydrated Mg-Al carbonate hydroxide. The mineral product has been associated with the formula $Mg_6Al_2CO_3(OH)_{16}.4\ H_2O$ while having the properties of manasseite and hydrotalcite. X-ray diffraction powder patterns have indicated that the mineral more closely resembles manasseite than hydrotalcite, while the differential thermal analysis curve of the precipitate has been characterized as similar to that given for hydrotalcite.

Kumura et al, U.S. Pat. No. 3,650,704, reports a synthetic hydrotalcite preparation by adding an aqueous solution of aluminum sulfate and sodium carbonate to a suspension of magnesium hydroxide. The suspension then can be washed with water until the presence of sulfate radical becomes no longer observable. The suspension is heated at 85° C. for three hours and dried. The magnesium component starting material is reported as any member of the group consisting of magnesium oxide, magnesium hydroxide, magnesium carbonate, and water-soluble magnesium salts, e.g., such as mineral acid salts including magnesium chloride, magnesium nitrate, magnesium sulfate, magnesium dicarbonate, and bittern. p It is an object of the present invention to produce adsorbents and substrate products from activated aluminas and synthetic hydrotalcite in high purity.

It is another object of this invention to produce adsorbents and substrate products having high mechanical strength, high porosity, low bulk density, and wide pore size distribution.

SUMMARY OF THE INVENTION

The present invention includes a composition useful as an adsorbent or substrate comprising hydrotalcite in amounts of about 20%–80% by weight and activated alumina in amounts of about 80%–20% by weight.

The present invention includes a method for producing a synthetic hydrotalcite for the adsorbent and substrate product compositions including reacting an activated magnesia with an aqueous solution of aluminate, carbonate, and hydroxyl ions. The method can be carried out at atmospheric pressure to form hydrotalcite in high purity and high yield. Activated magnesia used in this method is formed by heating a magnesium compound such as magnesium carbonate or magnesium hydroxide to a temperature between about 500°–900° C.

BRIEF DESCRIPTION OF THE DRAWINGS

FIG. 1 is a graphical depiction of a powder X-ray diffraction pattern obtained from synthetic hydrotalcite produced by the method of the present invention.

FIG. 2 is a graphical depiction of the differential thermal analysis of synthetic hydrotalcite obtained by the method of the present invention.

DETAILED DESCRIPTION

Figure 3:
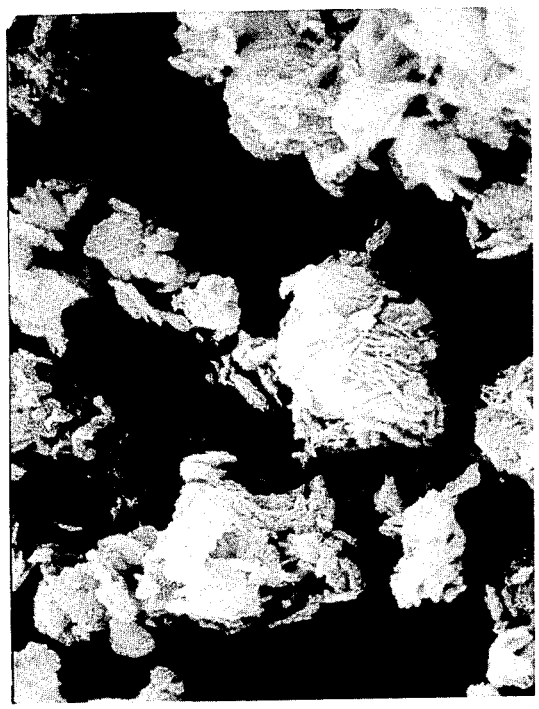
FIG. 3 is a photographic representation of synthetic hydrotalcite obtained by the method of the present invention.

The present invention provides an adsorbent and substrate product which combines the advantageous properties of activated alumina and activated hydrotalcite. Pore structures of alumina and the high surface area are important properties of the alumina influencing its behavior as an adsorbent. The size and geometry of the pore formed during dehydration is primarily related to the molecular structure of the hydroxide and can be altered only by relatively small differences by varying the methods of hydroxides preparation. The pore sizes of the alumina are small and on the order of about less than 50 Å in diameter. Such small pore sizes are a major disadvantage of the activated alumina for the adsorption of large molecules and for catalytic uses where the pores can get blocked by impurities.

Hydrotalcite, hydrated magnesium aluminum carbonate, produces a large pore skeleton structure upon thermal activation. The pore size in this case is mostly larger than about 170 Å. The larger pore size is attributable to the expulsion of water and carbon dioxide during thermal activation. The real density of dehydrated hydrotalcite is about 2.9 g/cm$^3$ compared to about 3.5 g/cm$^3$ for activated alumina. The thermal decomposition of hydrotalcite is complete at a temperature of about 500° C. which is the same temperature used in the preparation of activated alumina.

However, activated hydrotalcite is difficult to form in shapes, such as spheres, pellets, and extrudates which are commonly used for adsorption and for catalyst substrates.

In accordance with the present invention, adsorbent and substrate products are produced from activated alumina in combination with hydrotalcite to form a composition containing about 20%–80% by weight hydrotalcite and about 80%–20% by weight of activated alumina. The resulting composite product combines the advantageous properties of hydrotalcite and activated alumina to form a composite having high mechanical strength, high porosity, low bulk density, and a wide pore size distribution.

The product of the present invention is obtained by thoroughly mixing dry, powdered hydrotalcite with a partially activated alumina in the proportion of about 20%–80% by weight hydrotalcite and 80%–20% by weight alumina. Partially activated alumina is used, preferably in the form which is capable of rehydration so as to provide good mechanical strengths to the final product. Mixing is carried out at an apparatus which produces very uniform mixing of the materials. The mixed composite then can be subjected to a rehydration and forming process to create different geometrical shapes or forms. Such processes include ball forming in a pan-type agglomerator, agglomeration in a fluidized bed, extrusion, tabletting, or other similar operations.

The final activation of the formed product is carried out at about 500°–600° C. in a stationary or rotary calciner commonly employed for the production of activated alumina. Alternatively, the hydrotalcite alone can be activated by heating to temperatures of about 500°–600° C. prior to mixing with activated alumina to form the final product composite. The resulting product is a superior adsorbent and catalyst substrate having the characteristics of high mechanical strength, high porosity, low bulk density, and wide pore size distribution in the size range of about 20–600 Å. These properties can be varied in a controlled manner by varying the proportions of alumina and hydrotalcite in the starting mixture.

The present invention includes producing synthetic hydrotalcite by reacting activated magnesia with an aqueous solution of aluminate, carbonate, and hydroxyl ions. The magnesia must be activated to produce hydrotalcite in high purity. Otherwise, i.e., in the event that an unactivated magnesia is used, the resulting product will include substantial amounts of mineral forms other than hydrotalcite.

The activated magnesia can be formed by activating magnesium compounds such as magnesium carbonate or magnesium hydroxide at temperatures of between about 500°–900° C., preferably 550°–650° C. for a period of about 30–120 minutes. Below about 500° C., the magnesium salt will not activate sufficiently and will contain inhibiting amounts of the starting material. Above about 900° C., the resulting magnesium oxide takes on a form which is insufficiently active. The insufficiently active magnesia could be characterized as dead burnt. Such a form of magnesia will not form hydrotalcite predominantly over other mineral forms. The insufficiently active form of magnesia which is nonspecific to forming hydrotalcite will be avoided by heating the magnesium salt starting materials to elevated activating temperatures, but which must not exceed about 900° C., to form the activated magnesia or magnesium oxide (MgO).

The activated magnesium oxide is added to a solution containing ions of aluminate, carbonate, and hydroxyl. For example, a suitable solution may contain alkali hydroxide, alkali carbonate, and aluminum oxide. Industrial Bayer process liquor used for the production of alumina from bauxite is a suitable solution containing sodium hydroxide, sodium carbonate, and aluminate ions. A Bayer process liquor containing excess alumina also is suitable.

By way of example, 5–25 g/l of activated MgO can be added to 120–250 g/l NaOH (expressed as $Na_2CO_3$), 20–100 g/l $Na_2CO_3$, and 50–150 g/l $Al_2O_3$ in an aqueous solution. Such a solution provides a pH above about 13. Preferably, magnesia is added in an amount of about 1.0 mols to 2.5 moles aluminate ion. The mixture should be agitated at a temperature of about 80°–100° C. for 20–120 minutes.

It has been found that magnesium compounds other than the activated magnesia of the present invention produce less than desirable results. For example, $MgSO_4$, $MgCl_2$, or $MgNO_3$ added to Bayer liquor yields $Mg(OH)_2$ and $Al(OH)_3$. Therefore, the solution used in the process of the present invention is essentially free from chlorine or sulfate ions other than as impurities present in the bayer liquor. Similarly, $Mg(OH)_2$ added to Bayer liquor remains mostly unreacted.

The process of the present invention produces hydrotalcite in high yield. By high yield is meant a conversion yield greater than about 75% and preferably greater than about 90%.

The mineral produced by the method of the present invention can be analyzed by powder X-ray diffraction. The product formed by Example 2 of this specification was analyzed in powder form in a Siemens X-ray diffractometer having Model No. D-500 supplied by Siemens AG (W. Germany). The resulting X-ray diffraction pattern is depicted in FIG. 1. The diffraction pattern indicates that the product is hydrotalcite at high purity. The dÅ spacing obtained by X-ray diffraction is shown in Table I for the mineral obtained from the method of Example 2 and is compared to (1) the ASTM standard for hydrotalcite and (2) natural hydrotalcite as reported by Roy et al in the *American Journal of Science*, Vol. 251, at page 353. By these indications, the process of the present invention produces hydrotalcite in high purity.

High purity in the context of the present invention is established by the absence of diffraction lines attributable to compounds other than hydrotalcite. The absence of diffraction lines indicates that such other compounds are not present in any significant amount. By way of contrasting example, the material produced in Example 1 described hereinbelow using a non-activated magnesium oxide contains lines or peaks indicating the presence of compounds other than hydrotalcite. These lines are observed in the data in Table I for the dÅ spacing of the product from Example 1.

TABLE I

X-RAY DIFFRACTION

| ASTM (22-700) | | Natural Hydrotalcite (Snarum, Norway) | | Example 1 | | Example 2 | |
|---|---|---|---|---|---|---|---|
| dÅ | I/I Max. | dÅ | I/I Max. | dÅ | I/I Max. | dÅ | I/I Max. |
| 7.84 | 100 | 7.63 | 100 | 12.4676 | 4.3 | 8.8729 | 3.7 |
| 3.90 | 60 | 3.82 | 50 | 12.3128 | 4.8 | 7.7348 | 99.2 |
| 2.60 | 40 | 2.56 | 10 | 12.1094 | 4.2 | 7.6746 | 100.0 |
| 2.33 | 25 | 2.283 | 5 | 11.8579 | 5.5 | 6.0944 | 5.0 |
| 1.990 | 30 | 1.941 | 10 | 11.5907 | 4.2 | 6.0194 | 4.7 |
| 1.950 | 6 | 1.524 | 5 | 11.3070 | 4.7 | 5.9257 | 5.9 |
| 1.541 | 35 | 1.495 | 5 | 11.1268 | 4.2 | 4.0786 | 8.6 |
| 1.498 | 25 | | | 10.9421 | 4.2 | 3.9498 | 30.0 |
| 1.419 | 8 | | | 10.5889 | 4.1 | 3.8387 | 60.9 |
| 1.302 | 6 | | | 4.7678 | 45.7 | 3.8192 | 64.5 |
| 1.265 | 10 | | | 4.6131 | 6.9 | 2.6644 | 4.0 |
| 1.172 | 2 | | | 4.5742 | 6.0 | 2.5765 | 80.1 |
| 0.994 | 4 | | | 4.5429 | 3.9 | 2.5204 | 25.2 |
| 0.976 | 6 | | | 4.5093 | 5.3 | 2.5102 | 21.7 |
| | | | | 4.4645 | 4.9 | 2.4960 | 14.9 |
| | | | | 4.4154 | 3.3 | 2.4840 | 13.0 |
| | | | | 4.3161 | 3.3 | 2.4643 | 10.8 |
| | | | | 4.2944 | 3.0 | 2.4526 | 11.4 |
| | | | | 4.2552 | 3.2 | 2.4364 | 10.0 |
| | | | | 4.2163 | 5.9 | 2.0677 | 3.7 |
| | | | | 4.1814 | 5.4 | 2.0530 | 5.7 |
| | | | | 4.1349 | 7.4 | 2.0477 | 3.3 |
| | | | | 4.1009 | 6.9 | 2.0467 | 3.9 |
| | | | | 4.0676 | 9.7 | 2.0401 | 4.9 |
| | | | | 3.9759 | 13.9 | 2.0318 | 7.4 |
| | | | | 2.7284 | 5.4 | 2.0221 | 6.7 |
| | | | | 2.6458 | 4.1 | 2.0191 | 6.6 |
| | | | | 2.5774 | 30.4 | 2.0041 | 12.4 |
| | | | | 2.4920 | 7.3 | 1.9976 | 10.3 |
| | | | | 2.4800 | 6.6 | 1.5239 | 38.8 |
| | | | | 2.4660 | 8.0 | 1.5115 | 18.4 |
| | | | | 2.4372 | 19.9 | 1.4963 | 34.1 |
| | | | | 2.3703 | 100.0 | 1.3209 | 2.0 |
| | | | | 2.3191 | 15.5 | 1.3180 | 2.8 |
| | | | | 2.2869 | 17.1 | 1.3161 | 4.1 |
| | | | | 1.9616 | 5.2 | 1.3114 | 4.1 |
| | | | | 1.9465 | 9.7 | 1.3099 | 3.3 |
| | | | | 1.9372 | 8.3 | 1.2771 | 4.1 |
| | | | | 1.9302 | 8.2 | 1.2722 | 5.2 |

TABLE I-continued

| X-RAY DIFFRACTION | | | | | | | |
|---|---|---|---|---|---|---|---|
| ASTM (22-700) | | Natural Hydrotalcite (Snarum, Norway) | | Example 1 | | Example 2 | |
| dÅ | I/I Max. | dÅ | I/I Max. | dÅ | I/I Max. | dÅ | I/I Max. |
| | | | | 1.9244 | 7.3 | 1.2692 | 4.3 |
| | | | | 1.8194 | 5.0 | 1.2689 | 5.6 |
| | | | | 1.7953 | 27.1 | 1.2662 | 6.8 |
| | | | | 1.5740 | 29.2 | 1.2632 | 4.1 |
| | | | | 1.5614 | 3.0 | | |
| | | | | 1.5557 | 4.2 | | |
| | | | | 1.5347 | 4.7 | | |
| | | | | 1.5225 | 18.2 | | |
| | | | | 1.5102 | 7.9 | | |
| | | | | 1.4918 | 87.7 | | |
| | | | | 1.3745 | 4.9 | | |
| | | | | 1.3719 | 5.2 | | |
| | | | | 1.3692 | 3.0 | | |
| | | | | 1.3176 | 2.2 | | |
| | | | | 1.3121 | 7.8 | | |
| | | | | 1.3089 | 8.4 | | |

The product of Example 2 was analyzed by differential thermal analysis (DTA). FIG. 2 presents a graphical illustration of the DTA for the product of Example 2 which represents hydrotalcite in a high purity.

The synthetic hydrotalcite produced by the present method is a highly porous mineral. A photograph by scanning electron micrograph was taken of the product of the process carried out in Example 2 and is presented as FIG. 3. The photograph illustrates the mineral product at a 5,000× magnification. The mineral can be seen to have a high surface area and high porosity.

Synthetic hydrotalcite produced by the presently disclosed method combined with activated alumina is useful as an adsorbent in purification or as a catalytic substrate by virtue of an anion exchange capability wherein carbonate anion can be replaced with other anions without destroying the structure of the compound.

EXAMPLE 1

Magnesium carbonate in an amount of 25 grams was heated to about 1,100° C. for about 45 minutes and allowed to cool. The resulting magnesium oxide was added to a Bayer liquor prepared by digesting Surinam bauxite in a ratio of about 0.65 (defined as $Al_2O_3$/caustic expressed as $Na_2CO_3$, as used in industrial practice) at blow off and then filtered. One liter of Bayer liquor was heated to about 95° C. Ten grams of the magnesium compound treated at 1,100° C. were added. The mixture was agitated for one-half hour and then filtered. The residue was washed and dried at 105° C. overnight.

The resulting product weighed about 16.7 grams which indicates a yield of less than 67%. The product of this Example 1 was analyzed by powder X-ray diffraction and was found to contain predominant amounts of $Mg(OH)_2$ and MgO.

EXAMPLE 2

Activated magnesia was produced by heating 25 grams magnesium carbonate to about 600° C. for 45 minutes. The heating period of 45 minutes was selected to facilitate complete activation. For varying amounts and temperatures, the heating period should be adjusted to achieve an active product. Typical heating periods will range from about 30 to about 120 minutes.

Ten grams of the activated MgO were added to one liter of the same Bayer liquor used in Example 1. The mixture was heated to about 95° C. and agitated for about one-half hour. The mixture was filtered, and the residue was washed and dried at 105° C. overnight. The resulting precipitate had a white appearance, weighed about 22.5 grams, and had a refractive index of 1.50. The precipitate was a fine, free-flowing crystalline powder insoluble in water and organic solvents.

The precipitate was analyzed by powder X-ray diffraction and found to be hydrotalcite in high purity.

The 22.5 grams compares to a theoretical yield of 24.95 grams and indicates a high yield conversion of over 90%.

The synthetic hydrotalcite produced in accordance with this example decomposes upon heating to a temperature of about 300°–600° C. to form a highly porous and adsorbent product.

EXAMPLE 3

Synthetic hydrotalcite produced from the procedure disclosed in Example 2 was heated to about 500° C. for one and one-half hours to form an amorphous mineral material having the following properties.
Density—2.9 g/cc
Specific surface area—240 m²/g
Total pore volume—0.605 cc/g
Porosity—63.7%
Pore size:
   >30 Å—92%
   <30 Å—8%
Average pore size—167 Å
Pore size range (10–90%)—33 Å–630 Å

EXAMPLE 4

Synthetic hydrotalcite was mixed with rehydratable activated alumina and organic binder in amounts shown in Table II as a dry batch for 3–4 minutes. The dry mix was hydrated and then extruded at a diameter of 3/32 inches. The extrudate was aged in a steamed treatment at 110° C. and then was dried for about 12 hours. The dried extrudate was activated by calcining at a temperature of about 500° C. for about 2 hours. Properties of the resulting product are shown in Table II for density, surface area, total pore volume, crushed strength, and porosity.

TABLE II

| HYDROTALCITE - ALUMINA PRODUCTS MADE BY EXTRUSION | | | | | | | |
|---|---|---|---|---|---|---|---|
| Sample No. | 1 | 2 | 3 | 4 | 5 | 6 | 7 |
| Hydrotalcite, g | 0 | 0 | 80 | 80 | 195 | 195 | 320 |
| % | 0 | 0 | 20 | 20 | 50 | 50 | 80 |
| Alumina, g | 400 | 400 | 320 | 320 | 195 | 195 | 80 |
| % | 100 | 100 | 80 | 80 | 50 | 50 | 20 |
| Binder, g | 12 | 12 | 12 | 12 | 40 | 40 | 12 |
| Water, g | 275 | 275 | 254 | 254 | 285 | 285 | 238 |
| Extrudate dia. inches | 3/32 | 3/32 | 3/32 | 3/32 | 3/32 | 3/32 | 3/32 |
| Aging Treatment: | | | | | | | |
| Steam - Temp, °C. | 110 | 110 | 110 | 110 | 110 | 110 | 110 |
| Time, hr | 1 | 1 | 1 | 1 | 1 | 4 | 1 |
| Water - Temp, °C. | | 85 | | 85 | | | |
| Time, hr | | 4 | | 4 | | | |
| Drying: | | | | | | | |
| Temp, °C. | 110 | 110 | 110 | 110 | 110 | 110 | 110 |
| Time, hr | 12 | 12 | 12 | 12 | 12 | 12 | 12 |
| Activation (Calcination): | | | | | | | |
| Temp, °C. | 500 | 500 | 500 | 500 | 500 | 500 | 500 |
| Time, hr | 2 | 2 | 2 | 2 | 2 | 2 | 2 |
| Product Properties: | | | | | | | |
| Hg density g/cc | 0.9741 | 0.9234 | 0.9360 | 0.8994 | 0.8202 | 0.7757 | 0.8224 |
| He density g/cc | 3.251 | 3.224 | 3.203 | 3.200 | 3.168 | 3.160 | 3.129 |
| Surface area m²/g | 291.6 | 289.9 | 302.2 | 314.9 | 246.0 | 313.0 | 166.5 |
| Total pore vol. cc/g | 0.7190 | 0.7728 | 0.7562 | 0.7994 | 0.9036 | 0.9727 | 0.8964 |
| Crush strength, lbs | 18.14 | 28.27 | 18.69 | 33.24 | | | |
| Porosity: | | | | | | | |
| >10,000Å | 0.0151 | 0.0164 | 0.0343 | 0.0289 | 0.1504 | 0.1072 | 0.2986 |
| cc/g: | | | | | | | |
| >5000Å | 0.0403 | 0.0349 | 0.0578 | 0.0418 | 0.3066 | 0.2625 | 0.3947 |
| >1000Å | 0.1363 | 0.1186 | 0.1894 | 0.1264 | 0.5344 | 0.5386 | 0.5665 |
| >500Å | 0.1624 | 0.1330 | 0.2431 | 0.1582 | 0.5691 | 0.5742 | 0.6192 |
| >100Å | 0.3577 | 0.3021 | 0.4089 | 0.3756 | 0.6648 | 0.6807 | 0.7059 |
| >30Å | 0.7535 | 0.7721 | 0.7497 | 0.7910 | 0.8872 | 0.9359 | 0.8515 |

The resulting adsorbent or substrate composition having more than about 20% by weight hydrotalcite provides a significantly higher total pore volume. The composition comprising hydrotalcite in activated alumina in equivalent amounts by weight provides increased total pore volume, particularly at porosities above about 100 Å while surface area remains consistent with mixtures comprising lower amounts of hydrotalcite. Accordingly, the addition of synthetic hydrotalcite to the alumina in an adsorbent composition comprising above 20% below 80% by weight hydrotalcite provides high surface area and high pore volume from larger pore, i.e., above about 100 Å. Such larger pore volume is preferred in adsorbent and substrate products to avoid clogging of the smaller pores in adsorbent and substrate, i.e., such as catalytic substrate, applications.

While the invention has been described in terms of preferred embodiments, the claims appended hereto are intended to encompass all embodiments which fall within the spirit of the invention.

What is claimed is:

1. A composition useful as an adsorbent or substrate comprising about 20%-80% by weight hydrotalcite mixed with about 80%-20% by weight activated alumina, wherein said composition has been activated by heating the hydrotalcite to a temperature of about 500°-60020 C. or after mixing with the activated alumina.

2. A composition as set forth in claim 1 wherein said hydrotalcite is formd synthetically by reacting activated magnesia with an aqueous alkali solution containing ions of aluminate, carbonate, and hydroxyl at a temperature of about 80°-100° C. to form hydrotalcite in high yield.

3. A composition as set forth in claim 2 wherein said hydrotalcite is formed in high purity.

4. A composition as set forth in claim 3, wherein said reacting further comprising a first step of heating magnesium carbonate or magnesium hydroxide to a temperature between about 500°-900° C. to form said activated magnesia.

5. A composition as set forth in claim 4 wherein said magnesium carbonate or magnesium hydroxide is heated to a temperature between about 550°-650° C. for a period of about 30 to 120 minutes.

6. A composition as set forth in claim 5 wherein said aqueous solution containing ions of aluminate, carbonate, and hydroxyl comprises about 120-250 g/l NaOH (expressed as $Na_2CO_3$), about 20-100 g/l $Na_2CO_3$, and about 50-150 g/l $Al_2O_3$.

7. A composition as set forth in claim 6 wherein about 5-25 g/l activated magnesia is added to said aqueous solution.

8. A composition as set forth in claim 7, said reacting step further comprising washing and drying to recover hydrotalcite as a solid in high purity.

9. A method of producing an adsorbent or substrate comprising:
(a) heating magnesium carbonate or magnesium hydroxide to a temperature in the range of about 500°-900° C. to form activated magnesia,
(b) reacting said activated magnesia at a temperature of about 80°-100° C. with an aqueous alkali solution containing ions of aluminate, carbonate, and hydroxyl comprising 120-250 g/l NaOH (expressed as $Na_2CO_3$), 20-100 g/l $Na_2CO_3$, and 50-150 g/l $Al_2O_3$ to form a synthetic hydrotalcite,
(c) mixing said synthetic hydrotalcite with activated alumina, and (d) heating said synthetic hydrotalcite to a temperature of about 500°–600° C. before or after said mixing with said activated alumina.

10. A method as set forth in claim 9 wherein said aqueous solution has a pH above about 13 and said magnesia is added in an amount of about 1.0 mols to 2.5 mols aluminate ion.

11. A method as set forth in claim 10 wherein said solution is essentially free from chlorine or sulfate ions other than as impurities present in the Bayer liquor.

12. A method as set forth in claim 11 further comprising recovering hydrotalcite by drying and heating to a temperature in the range of about 500°–600° C. to form a highly porous and adsorbent product prior to mixing with the activated alumina.

13. A method as set forth in claim 12 wherein said mixing is followed by rehydration and forming steps carried out by pan-type agglomeration, fluidized bed, extruder, or tabletting.

14. A method as set forth in claim 13 wherein said reacting compreses heating to a temperature of at least about 80° C. at atmospheric pressure.

15. A method of producing an adsorbent product comprising:
 (a) heating magnesium carbonate or magnesium hydroxide to a temperature in the range of about 500°–900° C. to form activated magnesia,
 (b) reacting said activated magnesia with an aqueous solution of industrial Bayer liquor at a temperature of abut 80°–100° C. and a pH above about 13, said Bayer liquor containing aluminate, carbonate, and hydroxyl ions present in an amount of 120–250 g/l sodium hydroxide expressed as sodium carbonate, 20–100 g/l sodium carbonate, and 50–150 g/l aluminate,
 (c) washing and drying said hydrotalcite to form recovered hydrotalcite,
 (d) heating said recovered hydrotalcite to a temperature in the range of about 500°–600° C. to form a porous and adsorbent product,
 (e) mixing said porous product of hydrotalcite with activated alumina to form an adsorbent mixture, and
 (f) rehydrating said mixture of hydrotalcite and alumina and forming by pan-type agglomerator, fluidized bed, extruder, or tablet forming apparatus.

* * * * *